United States Patent [19]

van Loo

[11] 4,207,736

[45] Jun. 17, 1980

[54] ROTARY PISTON MACHINE

[76] Inventor: Pieter J. van Loo, Kobbe 50, Dokkum, Netherlands

[21] Appl. No.: 877,684

[22] Filed: Feb. 14, 1978

[30] Foreign Application Priority Data

Feb. 16, 1977 [NL] Netherlands .......................... 7701627

[51] Int. Cl.[2] .......................... F02B 53/08; F02C 5/04

[52] U.S. Cl. .................................... 60/39.34; 123/226

[58] Field of Search ............ 123/226, 44 D; 418/263; 60/39.34, 39.78; 417/462

[56] References Cited

U.S. PATENT DOCUMENTS

| | | | |
|---|---|---|---|
| 1,189,484 | 7/1916 | Raymond | 60/39.34 |
| 1,214,434 | 1/1917 | Cromp et al. | 60/39.34 |
| 1,263,475 | 4/1918 | Shepard | 60/39.34 X |
| 1,303,169 | 5/1919 | Copsey | 417/462 |
| 2,189,728 | 2/1940 | Daniels | 123/226 |
| 2,307,903 | 1/1943 | Voiles | 123/226 |
| 3,175,360 | 3/1965 | Glenn | 123/226 |
| 3,279,445 | 10/1966 | Karol | 123/44 D |
| 3,433,169 | 3/1969 | Graetz | 418/263 |

FOREIGN PATENT DOCUMENTS

| | | | |
|---|---|---|---|
| 14559 | of 1910 | United Kingdom | 60/39.34 |
| 254384 | 7/1926 | United Kingdom | 123/226 |

*Primary Examiner*—Michael Koczo

[57] ABSTRACT

A rotary piston machine comprising a housing, a central shaft fixedly connected to said housing, a cylinder mounted in said housing for rotation about said shaft, a cam on said shaft, a piston mounted within said cylinder, said piston having a recess functioning as a camming track co-operating with said cam for axially moving the piston in the cylinder upon rotation of said cylinder in the housing, said housing and said cylinder each having at least one fluid inlet and at least one fluid outlet. If the machine is formed as an internal combustion engine, the cylinder comprises at least one combustion space connectable to said fluid inlet and said fluid outlet and to ignition means.

1 Claim, 3 Drawing Figures

ROTARY PISTON MACHINE

Figure 1:
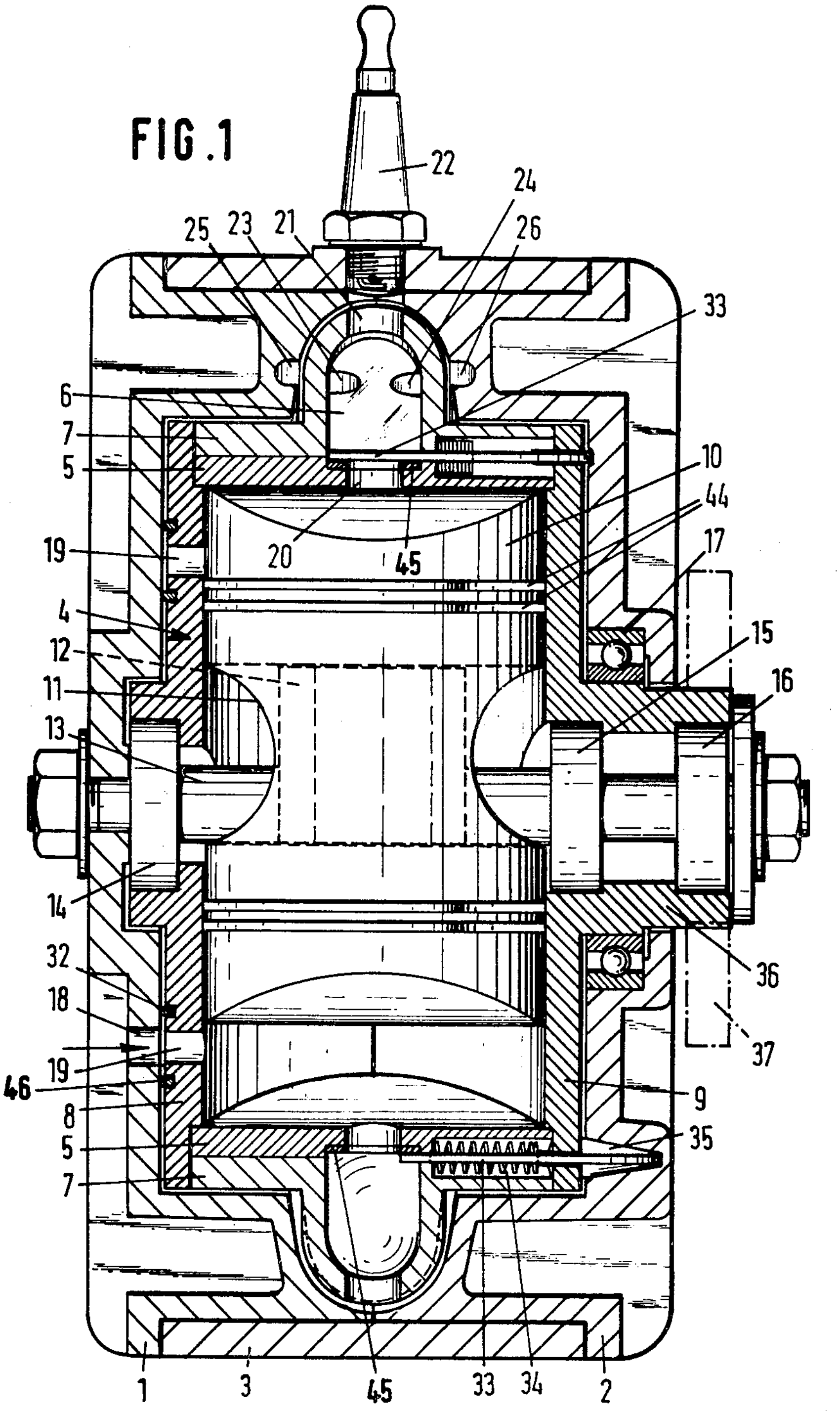

This invention relates to a rotary piston machine.

It is an object of the present invention to provide a rotary piston machine that is of the simplest possible construction.

According to the invention, there is provided a rotary piston machine comprising a housing, a central shaft fixedly connected to said housing, a cylinder mounted in said housing for rotation about said shaft, a cam on said shaft, a piston mounted within said cylinder, said piston having a recess functioning as a camming track co-operating with said cam for axially moving the piston in the cylinder upon rotation of said cylinder in the housing, said housing and said cylinder each having at least one fluid inlet and at least one fluid outlet.

Where the piston machine is formed as an integral combustion engine, the cylinder has at least one combustion space connectable to said fluid inlet and said fluid outlet and to an ignition mechanism.

In one embodiment of the invention, the combustion space is formed by a compartment projecting radially from the wall of the cylinder and communicating with the interior of the cylinder through an aperture in the wall thereof, the combustion space in the tangential direction being closed on one side and being provided on the other side with at least one outlet passage co-operating with an outlet port provided in an inner wall of the housing.

In order to improve the efficiency, spring-loaded means may be provided within the outlet port, which release the port at a pre-determined pressure.

According to a further feature of the invention, in order to avoid exposure of the piston to the high temperatures resulting from the combustion, the aperture referred to is closed with a spring-loaded valve controlled by a control groove provided in the inner wall of the housing.

In a further elaboration of the present invention, the housing consists essentially of three parts formed as solids of revolution, that is to say, two side parts and a coupling sleeve, and the cylinder consists essentially of a cylindrical barrel, a sleeve surrounding said barrel and provided with combustion spaces, and two side parts. There is thus provided a piston machine consisting almost entirely of parts that can be made on a lathe.

The machine according to the present invention not only has the advantage of being relatively small and consisting of a relatively small number of parts, but moveover has a low fuel consumption. Furthermore, maintenance and replacement of parts are simple.

The machine can be used as a compressor, water pump, and the like, and can also be constructed as an internal combustion engine and as a diesel.

The rotary piston machine according to the invention, formed as an internal combustion engine has as an advantage over and above a conventional four-stroke engine that it makes two working strokes per cycle. The advantage over a two-stroke engine is that it is cleaner because the inlet is independent of the outlet.

Figure 3:
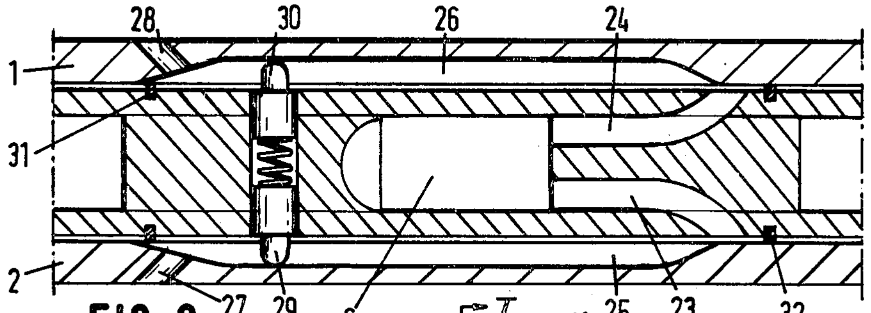
Figure 2:
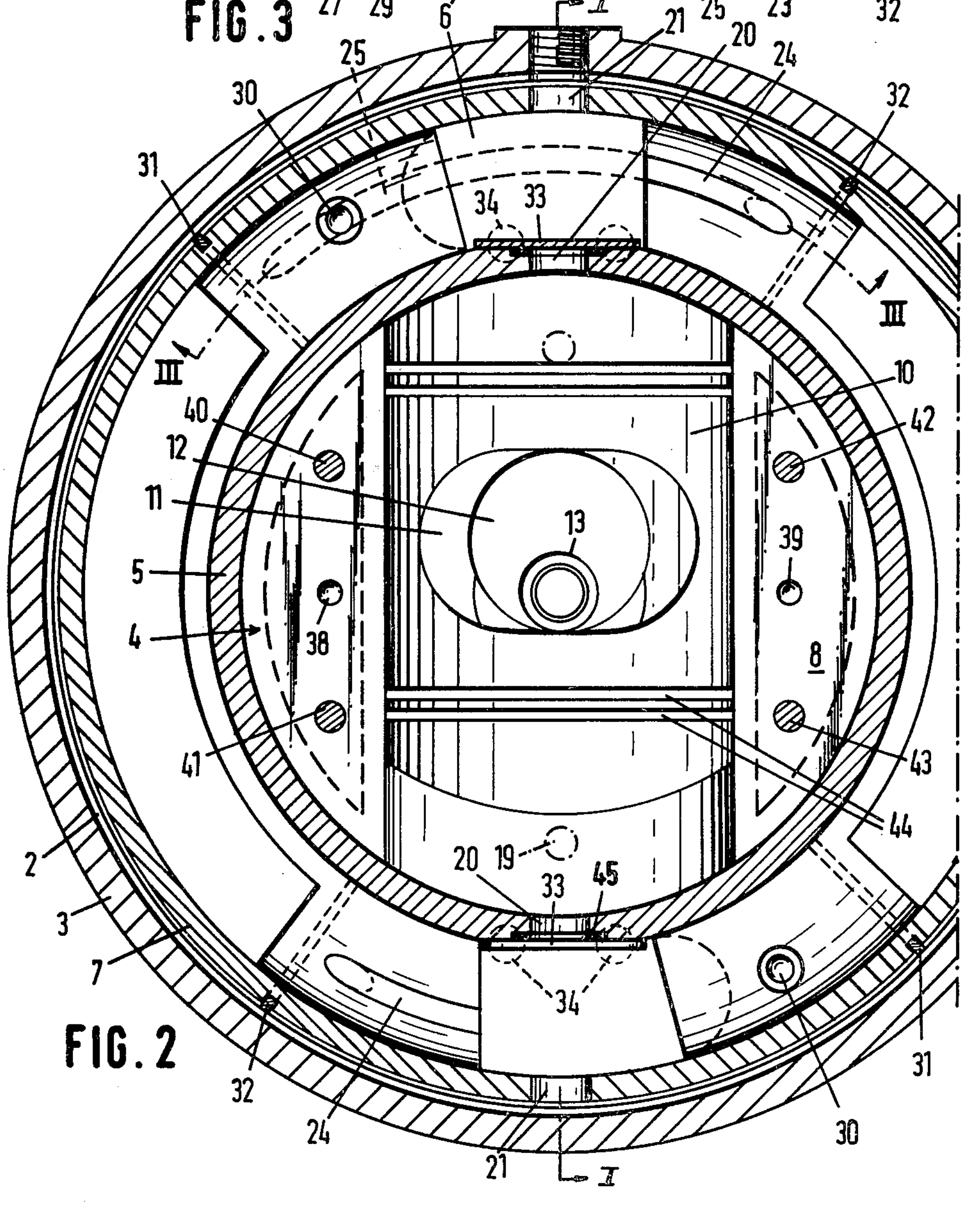

One embodiment of the present invention will now be described, by way of example, with reference to the accompanying drawings. In said drawings, FIG. 1 is a cross-sectional view of a rotary piston machine according to the present invention, taken on the line I—I of FIG. 2;

FIG. 2 is a part-sectional elevation of the piston machine illustrated in FIG. 1; and FIG. 3 is a cross-sectional view taken on the line III—III of FIG. 2.

Referring to the drawings, there is shown a rotary piston machine according to the present invention, comprising a housing consisting of two side parts 1 and 2 and a coupling sleeve 3. Mounted within the housing is a driven, rotary cylinder 4, consisting of a cylindrical barrel 5, a sleeve 7, fixedly mounted around it and equipped with two combustion spaces 6, and two side parts 8 and 9 which together with barrel 5 define a piston space. Housed in the piston space is a piston 10, equipped with piston rings 44, and centrally provided with an oval recess, i.e. camming track 11. Engaged with recess 11 is a cam 12, provided on a stationary shaft 13 mounted through bearings 14, 15 and 16 in cylinder 4, which in turn is mounted through a bearing 17, among other provisions, in the stationary housing 1, 2, 3.

Provided in the wall of the housing side-part 1 is an air inlet-port 18, through which an air-and-fuel mixture can be drawn into the space between piston 10 and the rotating cylinder 4 via an inlet port 10 provided in the rotor side part 8. Gaskets 32 and 46 are provided in cylinder side part 8 for sealing purposes.

Upon rotation of cylinder 4 and piston 10 housed therein, the mixture of air and fuel is compressed and forced via an aperture 20 in cylinder barrel 5 into combustion space 6. Provided in the wall of combustion space 6 is a port 21, through which the mixture can come into contact with an ignition mechanism (spark plug) 22, provided in coupling sleeve 3.

Combustion space 6 is provided with two outlet passages 23 and 24 (FIG. 3), which upon further rotation of cylinder 4 come into communication with outlet ports 25 and 26, respectively formed in housing side-parts 1 and 2, and with which connect outlet apertures 27 and 28, respectively.

In order that the highest possible power may be obtained from the combustion pressure, there are provided in the projecting part of sleeve 7, which part also accommodates the combustion space, two spring-loaded "valves" 29 and 30, respectively, which extend into outlet ports 25 and 26, respectively. The "valves" do not release the way to apertures 27 and 28 until at a pre-determined pressure.

Combustion space 6 is sealed from housing parts 1 and 2 by means of sealing rings 31 and 32, respectively.

In order to protect piston 10 from unduly high temperatures during the combustion of the mixture, valves 33 are provided, which can slide over apertures 20, the latter being provided with rings 45. Valves 33 are each under the pressure of springs 34, and are controlled by a groove 35 provided in the inner wall of housing side-part 2.

The rotation of cylinder 4 is transmitted through a hub 36, on which bearing 17 and in which bearings 15 and 16 are mounted, to a point outside the housing, and transmitted further by means of a wheel 37 mounted on the hub. By means of this wheel the machine can also be started by means for example of an electric motor.

FIG. 2 further shows dowel pins 38, 39 and bolts 40–43, which serve for interconnecting cylinder parts 8 and 9.

It is clear that many modifications and alterations will readily occur to those skilled in the art without departing from the scope of the present invention. Thus, for example, the engine can be constructed with connecting rods on the eccentric cam.

I claim:

1. A rotary piston machine comprising a housing formed by two substantially plane end walls and a substantially cylindrical intermediate wall, said walls defining a cylindrical interior space;

a disc shaped body sealingly fitting in said space and being rotatable around the axis of symmetry of said space;

a radial cylinder bore formed in said rotatable body;

a piston slidably mounted in said bore and having two end surfaces, said piston dividing said bore into two cylinder chambers;

a transverse recess formed in said piston intermediate said end surfaces and being directed perpendicular to the longitudinal axis of said cylinder bore;

crank means connected to said end walls and being laterally offset in respect to the axis of rotation of said body, said crank means cooperating with said recess so that upon rotation of said body said piston will move in said bore;

inlet port means in said housing communicating, in predetermined angular positions of said body, with said cylinder chambers and being connected with a source of combustible gas, so as to admit gas to one of said cylinder chambers during a part of the piston stroke;

a combustion space formed at each end of said bore and communicating with one of said cylinder chambers, said combustion space being defined by wall means, a part of said wall means contacting surfaces of said housing walls, and being provided with an aperture at the side directed towards the inner surface of said intermediate wall, said combustion space extending in the circumferential direction of said body;

spark means provided in said intermediate wall to ignite the combustible gas present in said combustion space when said aperture passes said spark means;

nozzle means in a transverse part of said wall means of said combustion space directed opposite to the direction of rotation of said disc shaped body, said nozle means adapted to direct a jet of combustion gases in a substantially peripheral direction is an annular space defined between said housing and the outer surface of said body, so as to cause said body to rotate in a direction opposite to the flow of said gases as a consequence of reaction forces; and outlet ports formed in said annular space at a predetermined angular distance from said spark means in the direction of rotation of said body.

* * * * *